Patented June 19, 1945

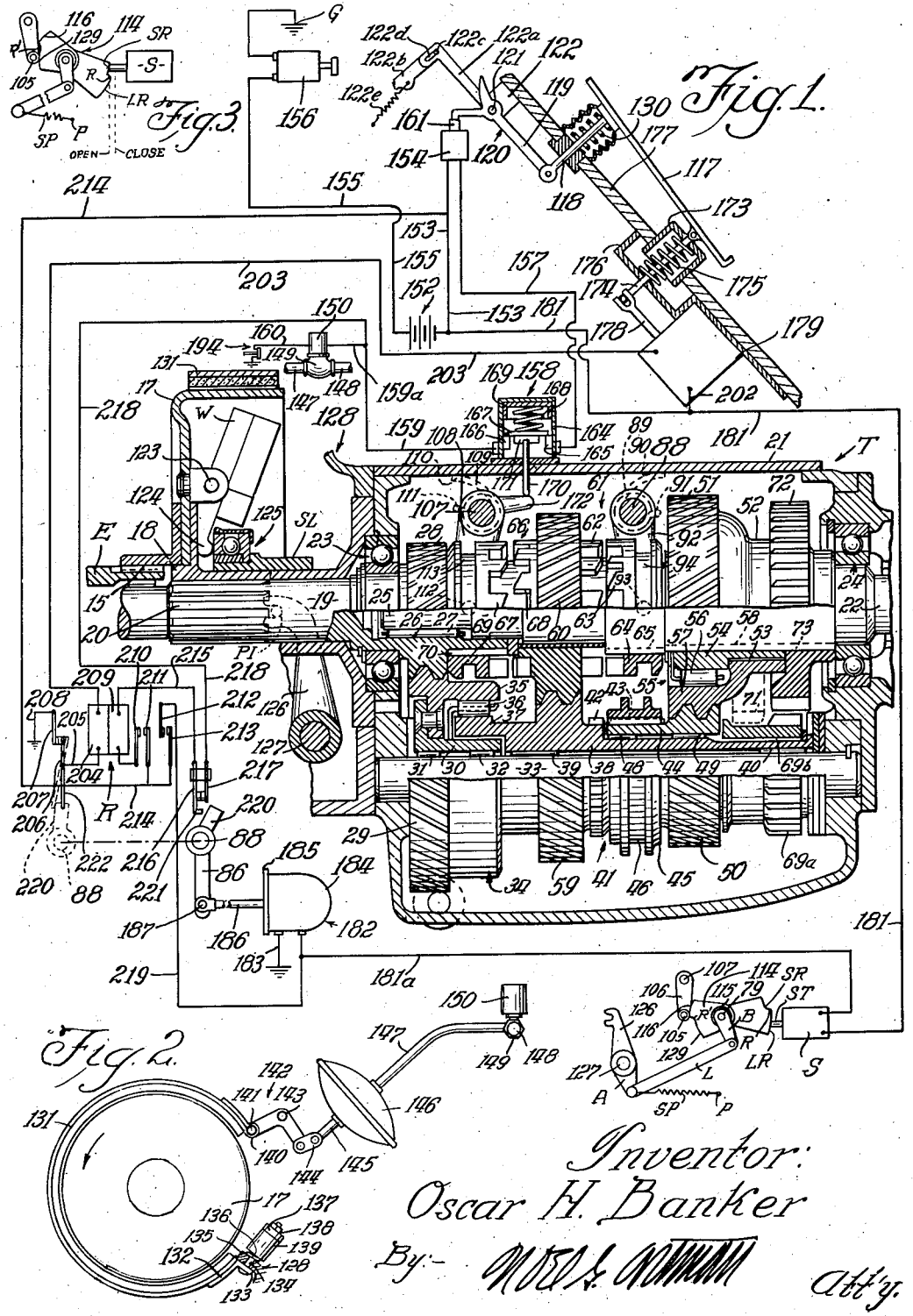

2,378,385

UNITED STATES PATENT OFFICE 2,378,385

POWER TRAIN INTERRUPTER FOR CHANGE-SPEED TRANSMISSIONS

Oscar H. Banker, Evanston, Ill., assignor to New Products Corporation, Chicago, Ill., a corporation of Delaware Application January 5, 1942, Serial No. 425,625

7 Claims. (Cl. 192—.01)

This invention has to do with power transmission apparatus for use between an engine and its load and relates more particularly to means for disrupting a power train of such apparatus while driving force is being transmitted thereby.

The present invention is especially useful in motor vehicle installations employing a high ratio power train for operation at cruising speeds but shiftable into a lower ratio train for enabling the engine to more quickly accelerate the vehicle as when overtaking and passing another vehicle upon the highway. Since the change from the higher to the lower ratio train is normally executed under conditions requiring a quick shift, the practice obtains of providing toothed members in the higher ratio train and which are demeshable under load to disrupt said train and permit the lower ratio train (mobilized during operation of the higher ratio train) to come into operation substantially instantaneously. To insure that the pressure between the teeth of the meshed members will not be sufficient to prevent their disengagement, an ignition interrupter circuit has been placed under control of the accelerator pedal to momentarily disable the ignition when the pedal is pressed slightly beyond open-throttle position. While the engine is thus caused to miss a few power strokes the toothed members are disengaged and thereupon the ignition is restored whereby the engine delivers its power through the lower ratio train.

One objection to the practice of interrupting the ignition circuit for the purpose and under the conditions just referred to is the consequent pumping of unexploded gas mixture into the exhaust line and the imminent likelihood of its explosion therein. There is the further objection that the ignition circuit may fail to restore, and, moreover, it is encumbered with auxiliary accessory equipment constituting a potential trouble source.

An important object of the present invention is the provision of a novel and improved mechanism, entirely independent of an ignition system, for relieving the tooth pressure between complemental toothed members in a power train to facilitate demeshing of said members during power transmittal through said train. This is accomplished by applying to one of the toothed members, which is urged by force from the power source to exert tooth pressure upon the complemental toothed member, a sufficient force in opposition to the power source force to significantly diminish the tooth pressure.

An additional object is the provision of opposing force exerting means, according to the just recited object, together with means for disabling the same upon the toothed members becoming demeshed.

A further object is the provision of apparatus, for expediting the demeshing of toothed members in the disruption of their associated power train, that is under supervision of a manipulatable power control member for a power source, such as an engine from which the train is driven, and which apparatus is caused by said control member to become effective coordinately with predetermined manipulation thereof while in a position causing substantial power output from said source.

Another general object of this invention is the provision of a new brake mechanism operable to momentarily impede the rotation of the drive member of rotating drive and driven meshed toothed members incident to the demeshing of said members in the disruption of a power train which they mobilize when meshed.

The invention further contemplates and has for one of its objects, the provision, in combination with a change-speed transmission wherein there is a synchronizer brake operable to slow the drive part of a jaw clutch to synchronism with a complemental driven part incident to meshing said parts in effecting a shift from a lower ratio train into a higher ratio train with which said clutch parts are associated, of means for demeshing said clutch parts while causing application of said brake to reduce the tooth pressure between said clutch parts and thus facilitate demeshing thereof.

A further object is the provision in a vehicle transmission installation of a demeshing control for applying braking force to the drive member of rotatable drive and driven toothed members demeshable to disrupt a power train, and said demeshing control being operable coordinately with predetermined manipulation of a power output control member for the vehicle engine irrespective of whether said member is in a position causing substantial power output of the engine.

These and other desirable objects inherent in and encompassed by the invention will be better understood from the ensuing description of a preferred embodiment thereof shown in the annexed drawing, wherein:

Fig. 1 shows a preferred embodiment of the invention, partly diagrammatically, combined with a motor vehicle change-speed transmission and an accelerator pedal or means manipulatable for controlling the power output of the vehicle engine;

Fig. 2 is a back end view of a brake and operating mechanism therefor which is a part of the invention embodiment shown in Fig. 1; and Fig. 3 is a side elevational view illustrating the governor-actuated cam of Fig. 1 in an actuated position corresponding to fourth speed.

The power transmission apparatus herein illustrated is designed especially for motor vehicle use. Its drive shaft 19 is driven from the hub 18 of a brake drum 17 which is preferably driven from the hub E of the runner or driven element of a fluid coupling device (not shown) operated from the vehicle engine in the usual manner.

The drive shaft 19 is connectible through change-speed gearing generally designated T enclosed within a gear box 21 and for turning a driven shaft 22, the shafts 19 and 22 being journalled in bearings 23 and 24 in the front and back walls of the gear box 21, and the front end of the driven shaft 22 having a bearing section 25 of reduced diameter piloted within a bearing cavity 26 in the back end of the drive shaft and journalled therein upon a set of needle bearings 27 according to standard practice.

Said gearing T has one reverse power train and four forward drive power trains of which the speed ratio is suitable for use in combination with a "geared-up" differential as that used in association with the rear axle shafts of automotive vehicles. When this transmission is employed in combination with such a "geared-up" differential the first, second and third speeds which are obtained through power trains including speed reduction gearing respectively correspond to the first, second and third speeds (of which the third is obtained by a direct connection of the drive and driven shafts) of a conventional three-speed transmission with a conventionally geared differential, whereas the fourth speed or direct drive connection of this transmission corresponds to a fourth or overdrive connection of such a conventional transmission when operating with an overdrive device of well-known character.

The first speed power train comprises a gear 28 integral with the drive shaft 19 and meshed with a countershaft gear 29 which has a sleeve-like hub 30 journalled by means of needle bearing sets 31 and 32 upon a countershaft bearing-rod 33 suitably anchored in the ends of the gear box. Power is transmitted from the gear 29 through an overrunning clutch 34 including a drive ring 35, clutch rollers 36 and a normally driven actuator member 37 operative to wedge the rollers against the ring when the latter tends to rotate counter-clockwise (as viewed from the front) relative to said actuator member. This actuator member 37 is integral with a long sleeve shaft 38 which is journalled upon the rod 33 by needle bearing sets 39 and 40. The transfer of power continues through a jaw clutch 41 comprising a driving part of clutch teeth 42 arranged circumferentially about the sleeve 38, a driven part comprising circumferentially arranged teeth 43 upon a sleeve 44 and a clutch ring 45 having internal teeth mutually meshable with the teeth 42 and 43 by sliding said ring forwardly to connect the sleeve 44 for rotation with the sleeve 38. A groove 46 in the ring 45 facilitates axial sliding of this ring by means of a shifter fork (not shown). When the clutch 41 is disengaged the sleeve 44 is freely rotatable about the sleeve 38 whereon it is carried by needle bearing sets 48 and 49. Said first speed power train is mobilized when the teeth of the clutch 41 are meshed. Thus a gear 50 integral with the sleeve 44 is driven through said clutch and drives a gear 51 which is journalled at its hub 52 upon a hub 53 of an actuator member 54 comprising a part of an overrunning clutch unit 55. This overrunning clutch unit includes clutch rollers 56 and a drive ring 57 integral with said gear 51 as well as said actuator member 54 which is splined at 58 to the driven shaft 22. The actuator member 54 has cam faces (not shown) so disposed that the gear 51 and ring 57 will be effective when rotated clockwise as viewed from the front for causing the rollers to wedge into driving relation between said ring and actuator member so the shaft 22 will be driven from the gear 51.

The second speed power train includes the drive shaft gear 28, the countershaft gear 29, overrunning clutch 34, sleeve 38, a gear 59 integral with said sleeve 38, a gear 60 meshed with said gear 59 and journalled upon the driven shaft 22, and a jaw clutch 61 of the overrunning type including a driving component of teeth 62 upon the gear 60 and teeth 63 upon a ring 64 splined at 65 to the driven shaft 22 and slidable axially of said shaft for meshing and demeshing the said teeth. When the clutch 61 is engaged the second speed power train will be established and during operation of this second speed power train the driven shaft will rotate faster than the gear 51 as permitted by the overrunning clutch 55 while the clutch 41 remains engaged for maintaining the first speed power train mobilized.

Third speed is obtained when the clutch 61 is disengaged and a clutch 66 is engaged. Clutch 66 comprises clutch teeth 67 and 68 which are respectively upon the back end of a ring 69, splined at 70 to the back end of the drive shaft 19, and upon the front face or end of the gear 60. Hence when the clutch 66 is engaged and the clutch 61 disengaged power may be transmitted from the drive shaft to the driven shaft through the third speed power train comprising said clutch 66, gears 60 and 59, clutch 41, gears 50 and 51 and the overrunning clutch 55 to the driven shaft. Meanwhile the actuator member 37 of the overrunning clutch 34 will be rotated faster than the clutch ring 35 as permitted by the rollers 36.

Fourth speed is obtained by connecting the drive and driven shafts 19 and 22 for rotation in unison and the power train for accomplishing this is established by concurrent engagement of the clutches 61 and 66, power then being transmitted from the drive shaft through said clutch 66, the hub of gear 60, clutch 61, and its splined member 64 to the driven shaft 22. Concurrently the actuator member 37 of overrunning clutch 34 will be driven at an overspeed with respect to the clutch ring 35 as permitted by the clutch rollers 36 and the actuator member 54 of the overrunning clutch 55 will be driven at an overspeed with respect to the gear 51 as permitted by the rollers 56.

The reverse power train includes the gears 28 and 29, overrunning clutch 34, sleeve 38, gear 69a splined to the sleeve 38 at 69b, an idler gear 71 (shown in dotted outline because of it being within the space between the observer and the parts shown in full lines), and a gear 72 splined at 73 to the driven shaft 22. The idler gear 71 is freely rotatable and axially slidable upon a countershaft (not shown) which is parallel with the shaft 22. When the idler gear 71 occupies a forward position, illustrated in Fig. 1, the reverse train is disconnected, but is connectible or establishable when the gear 71 is slid rearwardly manually, by means of a shifter fork (not shown) into mesh with the gears 69a and 72.

A cross shaft 88 has wrapped thereabout a spring 89 having an end section 90 which reacts against the top of the gear box while an opposite end section 91 acts upon the hub of a shifter fork 92 for rotating such fork and the shaft 88 clockwise, the arrangement being as that illustrated more fully in my copending application Serial No. 357,388. The legs of this shifter fork carry pins 93 projecting into diametrically opposite portions of a groove 94 in the clutch ring 64 whereby the clockwise movement of said shifter fork will slide the ring 64 forwardly for engaging the clutch 61. One section of the shaft 88 has an arm 86 rotatively fixed thereon (see lower left-hand portion of Fig. 1) as part of control apparatus, later described, for rotating said shaft and said shifter fork counter-clockwise to demesh the clutch 61 at will.

Another cross shaft, 107, carries a shifter fork 108, and a control arm 106, lower right-hand part of Fig. 1, for said shaft and said fork. Said shifter fork 108 is acted upon by a spring 109, shown in broken lines in Fig. 1, coiled about the shaft 107, one end 110 of the spring reacting against the upper wall of the gear box while the opposite end 111 is hooked about and acts upon said shifter fork to urge the same and the shaft 107 to rotate counter-clockwise. The legs of the shifter fork 108 carry pins 112 which project into a groove 113 of the clutch ring 69. Therefore, upon release of a stud 105 upon the lower and free end of the arm 106 the spring 109 would be effective for rotating the shaft 107 and the shifter fork 108 counter-clockwise to shift the clutch ring 69 rearwardly for engaging the clutch 66, or placing the ends of the teeth 67 and 68 of this clutch in ratcheting relation should the member 69 be rotating clockwise (as viewed from the front) at a speed in excess of the gear 60 as will be explained presently. However, when the vehicle is at rest as now assumed, a cam plate 114 fixed upon a sleeve 115 journalled upon a shaft 79 presents a portion of its long radius profile section 116 in registry with the stud 105 to preclude release of said stud at this time.

Preparatory to starting the vehicle forwardly, any kind of manual control, as illustrated in said copending application Serial No. 357,388, is manipulated for shifting the clutch ring 45 forwardly to engage the clutch 41 and for releasing the cross shaft 88 to place the clutch 61 under control of the spring 89 and a solenoid 182. Under normal starting conditions this solenoid, having a casing 184 with a flange 185 secured to the gear box 21, is energized by a circuit starting with ground G in the upper left-hand part of Fig. 1 and leading through contacts (not shown) closed when the engine ignition switch 156 is closed, conductor 155, battery 152, conductor 181, a switch S closed at this time, a conductor 181a, said solenoid, and a conductor 183 back to ground. Upon this energization of the solenoid 182 an armature therein holds a connecting link 186 to the right of the shown position, retaining the arm 86, cross shaft 88 and the shifter fork 92 in their counter-clockwise position against the urge of the spring 89 to hold the clutch 61 demeshed.

The vehicle may now be started forwardly in the first speed connection by depressing the toe portion of an accelerator 117 (means manipulatable for controlling the engine power output) for accelerating the vehicle engine in the customary manner. The engine throttle (not shown) is operatively connected with the accelerator pedal 117 by a linkage including a link 118, a leg 119 of a lever 120, a shaft 121 pivotally mounted in a bracket 122 and fixed to the lever 120 for pivotal movement therewith, an arm 122a fixed to the shaft 121, and a link 122b connected with the arm 122a by a lost-motion arrangement consisting of a pin 122c on the link 122b and an elongated hole 122d in the arm 122a. Means as the contraction spring 122e fixed at its lower end and connected with the link 122b at the opposite end tends to hold this link in the endwise position for closing the throttle. When the toe portion of the pedal 117 is depressed for opening the throttle and causing the engine to accelerate above idling speed the impeller of the aforesaid fluid coupling (not shown) will be caused to rotate sufficiently fast to transmit effective driving force to the coupling driven part E in the usual manner, this driving force being transmitted through the splined connections 15 and 20, the transmission drive shaft 19, gears 28 and 29, overrunning clutch 34, the gears 50 and 51, and the overrunning clutch 55 to the driven shaft 22.

As the vehicle proceeds while driven through the first speed train, a speed will eventually be reached at which the transmission drive shaft 19 and the brake drum 17 connected therewith will rotate sufficiently fast for causing a plurality of centrifugal weights W, of which one is shown in Fig. 1, to pivot counter-clockwise about their pivotal mountings 123 against the urge of a spring SP, lower right-hand part of Fig. 1, anchored at one end to the gear box by a pin P. Such pivotal movement of the weights W causes their heel portions 124 to shift a ball-bearing thrust unit 125 (that is, diametrically opposite pins PI in the bearing sleeve SL of said unit) backwardly against the upper notched ends of the legs of a fork 126 carried non-rotatively upon a cross shaft 127 journalled in the clutch housing 128. This shaft 127 operates a linkage including an arm A fixed to said shaft, a link L, and an arm B fixed to the sleeve 115 rotatable coaxially about the shaft 79 so that upon the aforesaid operation of the speed responsive device in pivoting the weights W counter-clockwise the cam plate 114 will be pivoted clockwise for removing its long radius profile section 116 from registry with the stud 105 while positioning a short radius section 129 opposite said stud and thereby placing the shaft 107 and the shifter fork 108 under control of the spring 109 so that this spring is then effective for shifting the clutch ring 69 backwardly to place the teeth of the clutch 66 in ratcheting relation since the drive shaft 19 and the clutch ring 69 non-rotatively attached thereto rotate faster than the gear 60 during operation of the first or second speed power trains. The ends of the clutch teeth 67 and 68 are bevelled in the manner shown to facilitate such ratcheting.

Said cam plate 114 also has a long radius profile section LR which, incident to said clockwise rotation of said plate, is moved from registry with the operating stem ST of the switch S and a short radius profile section SR which is thus moved into registry with said stem to permit endwise outward movement thereof for opening said switch, thereby deenergizing the solenoid 182 and permitting the parts of the clutch 61 to come into ratcheting relation under the force of the spring 89. The rises R and R' between the profile sections LR and SR and sections 116 and 129 are so disposed circumferentially of the cam that the switch S opens after the arm 106 is pivoted clockwise. While this operating sequence of the rises R and R' enables the operator to shift directly into third from first without the contingency of connecting the second speed train, while the vehicle is driven in first at a speed at which portions of the cam sections 129 and LR are in registry with the stud 105 and the switch stem ST, the paramount advantage obtains in the fact that with such arrangement of the rises R and R' the rise R will operate first on an automatic shift down from fourth speed to cause disconnection of the clutch 61 and establishment of the third speed train.

So long as the accelerator pedal 117 remains depressed at its toe portion the vehicle will proceed forwardly while driven in the first speed train and the clutch teeth 67 and 62 will continue ratcheting over the teeth 68 and 63. When the operator desires to shift from the first speed train into the second speed train he will simply release the toe portion of the pedal 117 which will then return to the position shown, under the influence of conventional spring means as a spring 130, and in doing so will pivot the arm 122a for enabling the spring 122e to close the engine throttle. Thereupon the engine will decelerate as will the drive shaft 19 and the gear 60, connected therewith through the gears 28, 29 and 59 and the overrunning clutch 34, while the driven part of the clutch 61 continues rotation at substantially constant speed due to the vehicle inertia. During this deceleration of the engine, the gears 50 and 51 will correspondingly decelerate while the normally driven member 54 of the overrunning clutch 55 overruns the gear 51 as permitted by the clutch rollers 56. When the engine slows down sufficiently for the clutch teeth 62 to synchronize with the clutch teeth 63 the spring 89 will slide the teeth 63 into mesh with the teeth 62 for establishing the second speed power train, the drive then being from the drive shaft 19 through the gears 28 and 29, overrunning clutch 34, gears 59 and 60 and the clutch 61 to the driven shaft 22. The normally driven member 54 of the overrunning clutch 55 will continue to overrun the normally driving ring 57 of this clutch.

Normally, the shift up from second is into fourth or direct drive, and when the operator executes this shift he will again simply release the toe portion of the pedal 117 for closing the engine throttle. Thereupon the engine will decelerate as will the drive shaft 19 and the clutch ring 69, while the driven shaft 22 and the gear 60 connected therewith through the clutch 61 will continue rotation at substantially constant speed due to the vehicle inertia. During this deceleration of the engine, the gears 28 and 29 will correspondingly decelerate while the gear 59, meshed with the gear 60, and the normally driven member 37 of the overrunning clutch 34 overruns the clutch ring 35 as permitted by the clutch rollers 36. When the engine slows down sufficiently for the clutch ring 69 to synchronize with the gear 60 the spring 109 will slide the teeth 67 into mesh with the teeth 68 for establishing the fourth speed power train, the drive then being from the drive shaft 19 through the clutch 66, the hub of the gear 60 and the clutch 61 to the driven shaft 22. The normally driven member 37 of the overrunning clutch 34 will continue to overrun the normally driving ring 35 of this clutch.

I provide under control of the accelerator pedal 117 means for expediting deceleration of the drive shaft 19 for more quickly synchronizing the parts of the clutches 61 and 66 so that less time is required in shifting from first to second and from second to the fourth in the manner just described. This synchronizer means comprises a synchronizer brake band 131, Figs. 1 and 2, frictionally engageable with the circumferential periphery of the brake drum 17 for resisting rotation thereof.

Referring now to Fig. 2, the brake band 131 is shown as having upon one end a bracket 132 on which there is an apertured ear 133 wherein there is disposed a bolt 134 which projects through an apertured boss 135 upon the inner side of the clutch casing 128. The ear 133 is normally held firmly against the face of the boss 135 adjacently thereto by means of a helical spring 136 about the bolt 134 and exerting expansive force against the opposite face of the boss 135 and a spring seat 137 held in selected position axially of the bolt by means of a nut 138. A collar 139 limits the distance the bolt 134 can move endwise in the stud 135 while compressing the spring 136. Upon the opposite end of the brake band 131 there is formed a loop 140 in which there is disposed a pintle member 141. A bell crank 142 pivotally mounted upon a pin 143 anchored in the clutch casing 128 is connected with the pintle 141 at one of its legs while the other leg of the bell crank is connected by a link 144 with an end of a reciprocal rod 145 which is connected with a motor diaphragm (not shown) within a motor 146. This motor is energizable by a vacuum line connected with a low pressure source as the intake manifold of the vehicle engine, said line including conduits 147 and 148 respectively connected with the motor 146 and said low pressure source and through which intercommunication is controlled by a valve 149. The valve 149 is in turn controlled by the armature of a solenoid 150, the latter being effective when energized by the passage of an electric current therethrough for moving its armature in a manner to cause communication of said low pressure source with the motor 146 through the valve 149 and said conduits 147 and 148. The valve 149 may be of the character shown in detail in my U. S. Patent No. 2,171,534, issued September 5, 1939. When the motor is thus connected with the low pressure source, the said diaphragm therein will be caused to move upwardly whereby the bell crank lever 142 will be rotated counterclockwise with sufficient force to cause the band 131 to apply substantial frictional drag or braking action upon the drum 17 which normally rotates in the direction of the arrow.

While the motor 146 is operable when connected with a low pressure source, it will be understood that this motor may be designed to operate in response to liquid or gas pressure applied thereto, or, any other type of motor may be used in place of the motor 146.

The electric circuit for controlling energization of the solenoid 150 starts with ground at G and includes contacts associated with the ignition switch 156 and closed when said switch is closed, a conductor 155, the battery 152, a conductor 153, a switch 154 under the control of the accelerator pedal 117, a conductor 157, a normally closed switch 158, conductors 159 and 159a between said switch 158 and the solenoid 150, a conductor 160 and a normally closed switch 194 operable when closed to connect the opposite side of the circuit with ground for completing the same. The switch 154 includes contact members between which circuit is closed when the bell crank 120 is rotated counter-clockwise to the position shown (pursuant to release of the accelerator pedal 117) to press an operating stem 161 of the switch downwardly. The switch 158 comprises a casing 164 mounted upon the gear box 21 and insulatively supported terminal members 165 and 166 which are normally mutually engaged by a circuit closing bridge 167 held in the position shown by a spring 168 which is insulated from the casing 164 by an insulator seat 169. A pin 170 is connected with the conductor bridge 167 by means of an insulator member 171. A boss 172 abuts against the lower end of the stem 170 to lift the conductor bridge 167 from engagement with the contacts 165 and 166 when the shifter fork 108 is rotated counter-clockwise for engaging the clutch 66.

It will be seen therefore that upon release of the accelerator pedal 117 for initiating the automatic change from second to fourth speeds, for example, each of the switches 154, 156, 158 and 194 is closed so the solenoid 150 will be energized for causing application of the synchronizer brake band 131 upon brake drum 17 to quickly decrease the speed of the clutch ring 69 to the speed of the gear 60 so the clutch 66 will engage for immediate establishment of the fourth speed train. When this train is established, however, the boss 172 will cause the switch 158 to open wherefore subsequent depression and release of the pedal 117 will fail to energize the solenoid 150 and the synchronizer brake 131 will not be applied.

While the apparatus is connected for operation through the fourth speed train, should the vehicle be slowed down to a speed at which the drive shaft 19 rotates at a predetermined minimum, the inertia force of the weights W will be overcome by a spring SP whereby the sleeve SL will move forwardly to allow rotation of the cam plate 114 far enough counter-clockwise (as from the fourth speed position shown in Fig. 3) to carry the rise R past the stem ST for closing the switch S and thus energizing the solenoid 182 and demeshing the clutch 61. The transmission is thus conditioned for driving through the third speed train should the engine then be accelerated. But should the engine and drive shaft 19 be allowed to slow down predeterminedly further the spring SP will further overcome the inertia force of the weights W whereupon the sleeve SL will move forwardly far enough to permit passage of the rise R' under the stud 105 for demeshing the clutch 66 so that if the engine is thereafter accelerated the drive will be through the first speed train. During deceleration of the engine and drive shaft to the speed at which the rise R' is carried under the stud 105 it will be noted the clutches 34 and 55 are overrunning whereby the clutch 66 is relaxed to facilitate demeshing thereof by the cam rise R'.

While operating in fourth speed, the operator may shift to third speed instantaneously, at will, by simply depressing the heel portion of the accelerator pedal 117 whereby a base member 173 upon which said pedal is mounted, together with a stem 174 connected with said base member, is shifted axially downwardly against the force of a spring 175 of which the ends bear oppositely against the member 173 and a bracket 176 suitably connected to the under side of a floor board 177 in the driver's compartment of the vehicle. Downward movement of the stem 174 causes pivotal movement of a lever 178 for closing a switch 179 whereby an electric circuit is energized for energizing the solenoid 182 and thus demeshing the clutch 61. Ordinarily when the heel portion of the accelerator pedal 117 is depressed for causing demeshing of the clutch 61 the toe portion of that pedal will be released wherefore little or no substantial pressure will exist between the teeth upon the counterparts of said clutch. Under these conditions the solenoid 182 can readily demesh the clutch. However, when the present apparatus is used upon a motor vehicle wherein it may be desired to shift downwardly from the fourth speed connection to the third speed connection while the engine is delivering power through the fourth speed connection, as when the vehicle is to quickly overtake and pass another vehicle upon the highway, the pressure may be sufficient between the teeth of the clutch 61 to prevent demeshing, unless means is provided for diminishing the tooth pressure. In the illustrated form of the invention the circuit energized by the closing of the switch 179 also causes application of the brake band 131 of the synchronizer brake onto the brake drum 17 and in this manner opposing the driving force of the engine sufficiently to materially diminish the pressure of the teeth 62 upon the clutch driving counterpart against the teeth 63 upon the driven counterpart.

Electric energy for the aforesaid electric circuit is obtained from the source 152 through the conductor 181, a lateral conductor 202 connecting with one side of the switch 179, a conductor 203 leading out of the switch 179 and which is adapted to be electrically connected by said switch with the conductor 202 when the switch is closed. The conductor 203 leads to one coil 204 of a double coil relay Re and the opposite end of said coil 204 is connected with ground through a conductor 205, a pair of normally closed relay contacts 206 and 207 and a conductor 208. Said relay R includes a second coil or winding 209, a pair of normally open contacts 210 and 211 and a second pair of normally open contacts 212 and 213. The movable contacts 211 and 213 are connected with the ungrounded side of the electric energy source 152 through the conductor 153 and a conductor 214. Contact 210 is connected with one end of the relay winding 209 whereas the opposite end of said winding is connected by conductor 215 with a movable contact 216 which is normally engaged with a fixed contact 217. The circuit continues from the fixed contact 217 through a conductor 218 and the short conductor 159a to the above described solenoid 150 which when energized opens the valve 149 for causing application of the brake band 131 upon the synchronized brake drum 17. The fixed relay contact 212 is connected with the solenoid 182 by a conductor 219.

Operation of the just described electric circuit is as follows:

It will be assumed that the driver of a vehicle upon which the present apparatus is installed is cruising along the highway with the fourth speed power train of the transmission in operation and that he overtakes another vehicle which he wishes to pass. In order to enable him to accelerate quickly for overtaking and passing said vehicle he will press upon the heel portion of the accelerator pedal for closing the switch 179, without necessarily releasing the toe portion of this pedal. Electric energy will then flow from the source 152 through the conductors 181 and 202, said switch 179, conductor 203, relay winding 204, conductor 205, contact pair 206—207 and the conductor 208 to ground. Current thus caused to flow through the winding 204 energizes the relay Re, opening the contact pair 206—207 and closing the contact pairs 210—211 and 212—213. The relay Re is so designed that the contact pairs 210—211 and 212—213 close prior to the opening of the contact pair 206—207, an operating characteristic obtained in a manner well-known in the relay art. This assures that a stick circuit including the contact pair 210—211 will be established before the braking of the energization circuit by the opening of the contact pair 206—207. Said stick circuit is provided from the battery conductor 214, and through the then closed contact pair 210—211, the other winding 209 of said relay, conductor 215, contact pair 216—217, conductors 218 and 159a, solenoid 150, conductor 160 and the normally closed switch 194 to ground. The just traced stick circuit in addition to holding the relay Re energized, energizes the solenoid 150 for causing application of the synchronizer brake 131—17, effecting a snubbing action upon the transmission drive shaft 19 and hence upon the driving counterpart of the jaw clutch 61. During this snubbing action for decreasing the net driving force applied to said clutch driving member, the circuit concurrently closed from the battery conductor 214 through the relay contact pair 212—213 and the conductor 219 to the solenoid 182, causes energization of said solenoid and the operation of the arm 86, cross shaft 88 and the shifter fork 92 for withdrawing the driven counterpart of the clutch 61 from mesh with said driving counterpart. It will be noted that the hub of said arm 86 is provided with a boss 220 which is operable immediately upon the demeshing of the clutch 61 to separate the contacts 216 and 217 by pressing against an extension 221 upon the movable contact 216. Such opening of the contacts 216 and 217 brakes the energization circuit for the solenoid 150 whereby the synchronizer brake is released. This circuit, broken by the contacts 216 and 217, further causes deenergization of the relay winding 209 and hence of the relay Re since this is the only winding energized at this time. Said boss 220 when thus rotated with the arm 86 also becomes interposed in the return path of an extension 222 on the movable contact 206 as indicated by the dotted lines in Fig. 1 to prevent closing of the contact pair 206—207 for reenergization of the relay until after subsequent clockwise movement of the arm 86 to the normal position shown.

Ordinarily the operator of the vehicle will but momentarily press the accelerator pedal heel portion for closing the switch 179. However, should the operator inadvertantly hold this pedal portion down, keeping the switch 179 closed until after the third speed power train is established, no injury will be caused to the apparatus, for upon the demeshing of the clutch 61 the contact pair 216—217 is opened to cause release of the brake band 131 from the brake drum 17, and the contact 206 is maintained separated from its mate 207 by the boss 220 so long as the arm 86 is in its counter-clockwise position for maintaining the clutch 61 demeshed. Therefore, potentialization of the conductor 203 cannot cause energization of the relay winding 204 and the relay winding 209 cannot energize for energizing the relay Re so long as the contacts 216 and 217 are separated. However, upon subsequent reestablishment of the fourth speed power train, or establishment of the second speed power train incident to which the clutch 61 is meshed and the stud 220 is in the position shown in Fig. 1, the contact pairs 206—207 and 216—217 will again assume their normal closed relation, conditioning the apparatus for a subsequent operation at the will of the operator.

While an electromagnetic motor comprising the solenoid 182 is shown herein for developing the work energy for opening the jaw clutch 61, it is within the contemplation of this invention that a control solenoid as 150 together with an associated control valve as 149 and a motor as 146 could be employed instead of the solenoid 182.

Should the operator, while the vehicle is being driven through the second speed train, wish to change to the first speed train to obtain more driving power from the engine or to enable him to maneuver the vehicle under closer supervision, he may do so instantaneously by momentarily depressing the heel portion of the accelerator pedal 117 for closing the switch 179 and energizing the solenoid 182 in the aforedescribed manner to rotate the arm 86, the shaft 88 and the shifter fork 92 counter-clockwise for disengaging the clutch 61. Since the clutch 66 will already be disengaged at this time, both the clutches 61 and 66 will then be disengaged so that establishment of the first speed train is immediately obtained. Upon the establishment of this power train the gear 59 will drive the gear 60 faster than the gear 50 drives the driven shaft 22 through the overrunning clutch 55 wherefore the clutch teeth 62 will rotate faster than the teeth 63 so these teeth will simply ratchet harmlessly upon deenergization of the solenoid 182 whereby the spring 89 is again effective for sliding the teeth 63 axially against the teeth 62. Therefore, a shift can now be made from the first speed train to the second speed train at will by momentarily releasing the accelerator pedal to permit the engine and the drive shaft 19 to decelerate sufficiently for the gear 60 to synchronize with a driven shaft at which time the spring 89 will slide the teeth 63 forwardly into mesh with the teeth 62 to establish the second speed train. During the synchronization period the switch 154 will be closed as will the switches 156, 158 and 194 so the solenoid 150 will be energized for causing application of the synchronizer brake band 131 to expedite synchronization of the driving and driven components of the clutch 61 in the manner above described with respect to the corresponding components of the clutch 66. However, when the accelerator is later depressed at its toe portion for taking up the drive through the second speed train it will be noted that the lost-motion connection consisting of the pin 122c and the elongated opening 122d will provide for the switch 154 being opened to release the brake band 131 before the engine throttle is opened so the action of this brake band will not first oppose the engine driving force and then quickly release, resulting in a surge of power from the engine.

It will be seen that I have provided an effective means, independent of the engine ignition or other essential operating parts of the engine or vehicle, for diminishing the pressure between the teeth of a clutch during the interval of time while it is being demeshed for disrupting a power train with which said clutch is associated. This means for decreasing the clutch tooth pressure is readily adapted for operation under control of a vehicle accelerator pedal, and has the further advantage of making use of a synchronizer brake which comprises a part of the transmission with which said means is affiliated.

While I have herein shown and described a preferred embodiment with the view of fully illustrating the invention, it should be understood that the invention extends to other forms, arrangements, structures and details falling within the scope and spirit thereof and not sacrificing all of its material advantages.

I claim:

1. In a power transmission system for use between a load and an engine controllable in power output by the manipulation of a control means therefor, which system includes a power train having toothed members meshable to establish such train in driving relation between said load and engine whereby one of said members is urged by said engine to incur pressure of its teeth upon teeth of the other member pursuant to the transmission of driving force by said train from the engine to the load, and wherein said toothed members are demeshable to disrupt such driving relation of said power train; means for disrupting said driving relation of the power train, including means operable coordinately with predetermined manipulation of said control means, while the latter is in a position causing substantial power output of the engine, to counteract said urge of the engine upon said one toothed member and thus diminish said tooth pressure, means operable to demesh said toothed members, and means operable coordinately with said predetermined manipulation of said control means to operate said demeshing means during the diminution of said tooth pressure.

2. The combination set forth in claim 1, and wherein there is means operable coordinately with the demeshing of said toothed members to contravene the operation of said counteracting means.

3. In a power transmission system for use between a load and an engine controllable in power output by the manipulation of a control means therefor, which system includes a power train having toothed members meshable to establish such train in driving relation between said load and engine whereby teeth of one such member incur pressure upon teeth of the other pursuant to the transmission of power by said train from the engine to the load, and which toothed members are demeshable to disestablish said power train incident to the establishment of a different driving connection between said engine and load; means for so disestablishing said power train, comprising brake means including a part operably connected with said one toothed member, means operable coordinately with predetermined manipulation of said control means, while in a position causing substantial power output of the engine, to cause actuation of said brake means to constrain said brake part to modify the position of said one toothed member relatively to the other for diminishing said pressure between their teeth, means operable to demesh said toothed members, and additional means operable coordinately with such predetermined manipulation of said control means to operate said demeshing means during the diminution of said tooth pressure.

4. The combination set forth in claim 3, and wherein there is means operable coordinately with the demeshing of said toothed members to contravene said actuation of the brake means.

5. In apparatus for drivingly connecting a load with an engine controllable in power output by manipulation of a control means therefor, a change-speed transmission comprising a plurality of different speed ratio power trains individually establishable in driving relation between the engine and load, a higher speed transmitting ratio of said trains including drive and driven toothed members respectively rotatable with and according to the speed of the engine and the load and meshable for establishing such train when said members are synchronized, brake means including a part connected for rotation with the drive toothed member, means operable coordinately with predetermined manipulation of said control means, in decreasing the engine output, to cause actuation of said brake means for decelerating the drive toothed member to synchronism with the driven toothed member to facilitate meshing of said members incident to a shift upwardly into said higher ratio train, a lower ratio of said trains including an overrunning clutch to enable such train to remain mobilized while the higher ratio train is established and in operation and preparatory to taking up the drive upon demobilization of the higher ratio train, demeshing means actuatable to demesh said toothed members, means operable coordinately with a different predetermined manipulation of said control means, while in a position causing substantial engine output, to cause actuation of said brake means and consequent diminution of the pressure between the teeth of said toothed members, and means operable coordinately with such different manipulation of said control means to actuate said demeshing means during said diminution of tooth pressure.

6. In a power transmission system having a power train including rotatable drive and driven toothed members demeshable to disrupt said train; means for disrupting said train while it is transmitting force, and hence while teeth of the driving member exert pressure upon teeth of the driven member, comprising demeshing means operable to demesh said teeth, brake means operable to resist rotation of said driving member, and electric circuit means including electrically controlled means operable upon a predetermined condition of said circuit means, with respect to its energization, to cause operation of said demeshing means, an additional means operable upon said predetermined circuit condition to cause operation of said brake means and consequent diminution of said tooth pressure to facilitate said operation of the demeshing means, switch means operable to create said predetermined circuit condition, and switch means operable coordinately with the demeshing of said toothed members to alter said predetermined circuit condition for terminating the operation of said brake means.

7. In a power transmission system having a power train including rotatable drive and driven toothed members demeshable to disrupt said train and for use between a load and an engine that is controllable in power output by manipulatable control means; means for disrupting said train while it is transmitting force, and hence while teeth of the driving member exert pressure upon teeth of the driven member, comprising demeshing means operable to demesh said teeth, brake means operable to resist rotation of said driving member, and electric circuit means including electrically controlled means operable upon a predetermined condition of said circuit means, with respect to its energization, to cause operation of said demeshing means, and additional means operable upon said predetermined circuit condition to cause operation of said brake means and consequent diminution of said tooth pressure to facilitate said operation of the demeshing means, switch means operable coordinately with a predetermined manipulation of said control member while the latter is in a position for causing substantial power output of the engine, to create said predetermined circuit condition, and switch means operable coordinately with the demeshing of said toothed members to alter said predetermined circuit condition for terminating the operation of said brake means.

OSCAR H. BANKER.